(12) United States Patent
Uchida et al.

(10) Patent No.: US 10,009,867 B2
(45) Date of Patent: Jun. 26, 2018

(54) FADING DOPPLER FREQUENCY ESTIMATION DEVICE AND FADING DOPPLER FREQUENCY ESTIMATION METHOD

(71) Applicant: NEC Corporation, Tokyo (JP)

(72) Inventors: Ryosuke Uchida, Tokyo (JP); Masayuki Kimata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 267 days.

(21) Appl. No.: 14/412,323

(22) PCT Filed: Apr. 25, 2013

(86) PCT No.: PCT/JP2013/062216
§ 371 (c)(1),
(2) Date: Dec. 31, 2014

(87) PCT Pub. No.: WO2014/006961
PCT Pub. Date: Jan. 9, 2014

(65) Prior Publication Data
US 2015/0189617 A1    Jul. 2, 2015

(30) Foreign Application Priority Data

Jul. 6, 2012  (JP) ................. 2012-152479

(51) Int. Cl.
*H04B 17/00* (2015.01)
*H04B 7/00* (2006.01)
(Continued)

(52) U.S. Cl.
CPC .............. *H04W 64/00* (2013.01); *H04B 7/01* (2013.01); *H04L 27/0014* (2013.01)

(58) Field of Classification Search
CPC ... H04L 1/0009; H04B 1/7107; H04B 1/7117; H04B 7/0857; H04B 7/722
(Continued)

(56) References Cited

U.S. PATENT DOCUMENTS 7,680,203 B2  3/2010  Kuroda
7,684,527 B2  3/2010  Yokoyama
(Continued)

FOREIGN PATENT DOCUMENTS

CN  1525672  9/2004
CN  1801794  7/2006
(Continued)

OTHER PUBLICATIONS

International Search Report, PCT/JP2013/062216, dated Aug. 6, 2013.
(Continued)

*Primary Examiner* — Simon Nguyen
(74) *Attorney, Agent, or Firm* — Young & Thompson (57) ABSTRACT

Channel estimator 101, based on the received signal received through a radio channel, estimates an estimated value of a channel showing channel characteristics of the radio channel. Correlation value calculator 103 calculates a time domain channel correlation value showing the time correlation of the radio channel, based on the estimated value of the channel. Channel power calculator 102 calculates channel power as the power of the received signal, based on the estimated value of the channel. Noise power calculator 104 calculates noise power as the power of the noise component contained in the received signal. Corrector 105 corrects the channel power based on the noise power and corrects the time domain channel correlation value based on the corrected channel power and the noise power. Fading Doppler frequency estimator 200 estimates the fad-
(Continued)

10 ing Doppler frequency based on the corrected time domain channel correlation value.

9 Claims, 6 Drawing Sheets

(51) Int. Cl.
*H04B 15/00* (2006.01)
*H04W 64/00* (2009.01)
*H04B 7/01* (2006.01)
*H04L 27/00* (2006.01)

(58) Field of Classification Search
USPC ...... 455/10, 504–506, 63.1, 65, 67.11, 67.13
See application file for complete search history.

(56) References Cited

U.S. PATENT DOCUMENTS

| | | | |
|---|---|---|---|
| 8,107,909 B2 | 1/2012 | Okino et al. | |
| 8,744,013 B2 | 6/2014 | Pham et al. | |
| 8,750,357 B1* | 6/2014 | Choi | H04B 17/336 375/227 |
| 2002/0161560 A1* | 10/2002 | Abe | H04L 1/005 702/196 |
| 2002/0191535 A1* | 12/2002 | Sugiyama | H04L 1/06 370/208 |
| 2004/0091057 A1* | 5/2004 | Yoshida | H04L 25/03146 375/260 |
| 2005/0159928 A1* | 7/2005 | Moser | H04B 1/7075 702/189 |
| 2005/0281358 A1* | 12/2005 | Bottomley | H04B 1/712 375/343 |
| 2006/0007994 A1* | 1/2006 | Lai | H04L 27/22 375/227 |
| 2006/0269006 A1 | 11/2006 | Kuroda | |
| 2010/0046661 A1* | 2/2010 | Yoshida | H04B 1/71052 375/285 |
| 2010/0197262 A1* | 8/2010 | Hosokawa | H04B 17/345 455/234.1 |
| 2010/0285766 A1 | 11/2010 | Okino et al. | |
| 2011/0206168 A1* | 8/2011 | Matsuoka | H04B 17/345 375/346 |
| 2011/0268169 A1* | 11/2011 | Mitsugi | H04L 25/0212 375/226 |
| 2013/0259109 A1* | 10/2013 | Liu | H01Q 1/243 375/227 |
| 2015/0085820 A1* | 3/2015 | Ma | H04B 7/04 370/330 |

FOREIGN PATENT DOCUMENTS

| | | |
|---|---|---|
| CN | 1841986 | 10/2006 |
| CN | 101030787 | 9/2007 |
| CN | 101809908 | 8/2010 |
| JP | H2-231820 | 9/1990 |
| JP | H9-18399 | 1/1997 |
| JP | 2005-159655 | 6/2005 |
| JP | 2006-279590 | 10/2006 |
| JP | 2007-124632 | 5/2007 |
| JP | 2009-088984 | 4/2009 |
| JP | 4358686 | 8/2009 |
| WO | 2006098008 | 9/2006 |
| WO | 2011/083876 | 7/2011 |

OTHER PUBLICATIONS

Sakamoto et al., "Time Correlation Based Maximum Doppler Frequency Estimator for W-CDMA Receiver", IEEE VTC2001 Fall, pp. 2626-2629.
Japanese Office Action dated Nov. 27, 2015, with English Translation; Application No. 2014-523627.
Japanese Office Action for Application No. 2014-523627 dated May 17, 2016, with partial English translation.
Chinese Office Action for Application No. 201380036062.1 dated May 5, 2016, with English translation.
Hua Jing-yu, et al., "SNR estimation scheme and its application in Doppler shift estimation in mobile communication systems," Journal on Communications, vol. 26 No. 5, May 2005 (with English Abstract).

* cited by examiner

FADING DOPPLER FREQUENCY ESTIMATION DEVICE AND FADING DOPPLER FREQUENCY ESTIMATION METHOD

TECHNICAL FIELD

The present invention relates to a fading Doppler frequency estimation device that estimates the fading Doppler frequency from the received signal in mobile communications.

BACKGROUND ART

In mobile communications, in order to realize high quality communication by efficiently using limited radio resources, various communication control technologies have been proposed. Most of such communication control technologies use control in accordance with the moving speed of the mobile terminal. For example, the parameters used for adaptive equalization to reduce the influence of signal interference contained in the received signal are determined in accordance with the moving speed of the mobile terminal. Further, in power control in which the transmit power varies in accordance with the reception conditions at the mobile terminal and in adaptive modulation in which the code modulation scheme is selected depending on the reception conditions at the mobile terminal, the moving speed of the mobile terminal is used to estimate the reception conditions. For this reason, precise estimation of the moving speed of the mobile terminal is needed in order to realize high-quality communication.

As the indicator representing the moving speed of the mobile terminal, the fading Doppler frequency is usually used. Because of reflection of signals by buildings and others, a plurality of communication signal propagation channels are formed between the base station and the mobile terminal. Signals that have passed through multiple propagation channels vary in amplitude and phase with time when they are superimposed and received at the mobile terminal or base station. This phenomenon is called fading. As a scale to measure the rate of time variation of the fading, the fading Doppler frequency may be used. Since time variation of fading arises due to movement of the mobile terminal, the moving speed of the mobile terminal corresponds to the fading Doppler frequency.

As a method for estimating the fading Doppler frequency, there is a known method which uses the time domain channel correlation value, or the normalized covariance of the channel estimated value that shows the channel characteristics of radio channels. In this method, the base station or mobile terminal, based on the received signal, acquires an estimate of the channel value at regular intervals, and estimates the time domain channel correlation value based on the estimated values of channel. Since it is known that the time domain channel correlation value and the fading Doppler frequency are related by a zero-ordered Bessel function, the base station or the mobile terminal, based on this relationship, estimates the fading Doppler frequency from the estimated time domain channel correlation value (see Patent Document 1).

Since it is possible to accurately estimate the moving speed by estimating the fading Doppler frequency with precision, appropriate communication control can be carried out. However, when the signal level of the received signal is low, the ratio of the noise component contained in the channel estimated value becomes large, so that the time domain channel correlation value tends to be estimated to be smaller than the actual value. As a result, a problem occurs in which the estimation accuracy of the fading Doppler frequency decreases.

To resolve this problem, a method has been proposed that prevents deterioration in the estimation accuracy, in which the Doppler frequency fades, by correcting the time domain channel correlation value based on the ratio of the power of the true signal component and the power of the noise component in the received signal, namely, the signal-to-noise ratio (Signal-to-Noise Ratio: which will be abbreviated hereinbelow as SNR)(see Non-patent Document 1).

RELATED ART DOCUMENTS

Patent Documents

Patent Document 1: JP4358686

Non-Patent Documents

Non-patent Document 1: "Time Correlation Based Maximum Doppler Frequency Estimator for W-CDMA," IEEE VTC2001 Fall, pp. 2626-2629

SUMMARY OF THE INVENTION

Problems to be Solved by the Invention

However, since it is difficult to measure the power of the true signal component based on the received signal, in actual measurement of SNR, the power of the received signal (which will be referred to hereinbelow as channel power) including the noise component is used.

In this case, the greater the ratio of the noise component, the greater is the deviation of the channel power from the power of the true signal component, hence deviation of the measured SNR from the actual SNR also becomes large.

For this reason, the technology described in Non-patent Document 1 entails the problem in which the greater the ratio of the noise component, the lower is the accuracy with which the fading Doppler frequency is estimated, thereby reducing the estimation accuracy of the fading Doppler frequency.

The object of the present invention is to provide a fading Doppler frequency estimation device and a fading Doppler frequency estimation method that can improve estimation accuracy of the fading Doppler frequency.

Means for Solving the Problems

A fading Doppler frequency estimation device according to the present invention includes: a channel estimator that, based on the received signal received through a radio channel, acquires the estimated value of a channel showing channel characteristics of the radio channel; a correlation value calculator that calculates a time domain channel correlation value showing the time correlation of the radio channel, based on the estimated value of the channel; a channel power calculator that calculates channel power as the power of the received signal, based on the estimated value of the channel; a noise power calculator that calculates noise power as the power of the noise component contained in the received signal; a corrector that corrects the channel power based on the noise power and corrects the time domain channel correlation value based on the corrected channel power and the noise power; and, a fading Doppler frequency estimator that estimates the fading Doppler frequency based on the corrected time domain channel correlation value.

A fading Doppler frequency estimation method according to the present invention includes the steps of: acquiring, based on the received signal through a radio channel, the estimated value of a channel showing channel characteristics of the radio channel; calculating a time domain channel correlation value showing the time correlation of the radio channel, based on the estimated value of the channel; calculating channel power as the power of the received signal, based on the estimated value of the channel; calculating noise power as the power of the noise component contained in the received signal; correcting the channel power based on the noise power; correcting the time domain channel correlation value based on the corrected channel power; and, estimating the fading Doppler frequency based on the corrected time domain channel correlation value and the noise power.

Effect of the Invention

According to the present invention, it is possible to improve the estimation accuracy of the fading Doppler frequency

MODE FOR CARRYING OUT THE INVENTION

Now the exemplary embodiment of the present invention will be described with reference to the drawings. In the description hereinbelow, repeated explanation may be omitted by allotting the same reference numerals to the components having the same functions.

The First Exemplary Embodiment

Figure 1:
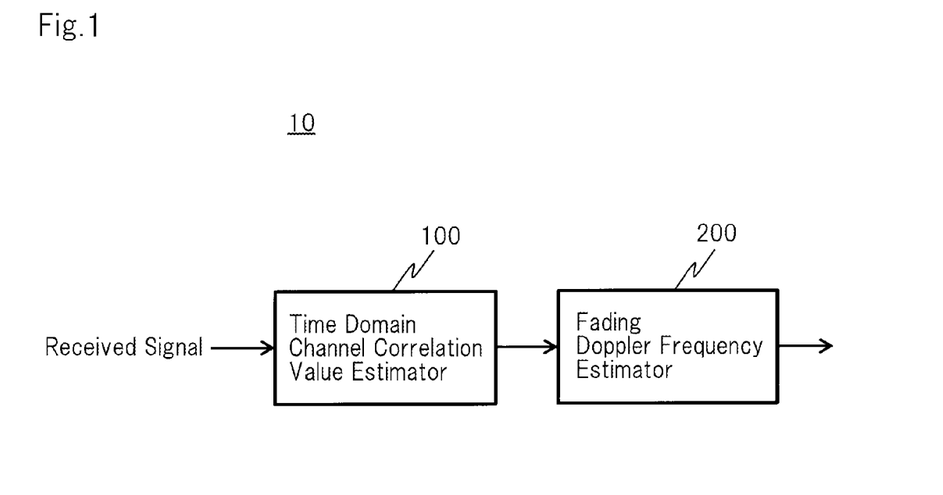
FIG. 1 A block diagram showing a functional configuration of a fading Doppler frequency estimation device according to the first exemplary embodiment of the present invention.

Next, the first exemplary embodiment will be described.
FIG. 1 is a block diagram showing a functional configuration of a fading Doppler frequency estimation device according to the first exemplary embodiment of the present invention. Fading Doppler frequency estimation device 10 is a communication device for performing mobile communication and is supposed to include a communication station (not shown) such as a base station, mobile terminal or the like.

Fading Doppler frequency estimation device 10 shown in FIG. 1 includes time domain channel correlation value estimator 100 and fading Doppler frequency estimator 200.

Time domain channel correlation value estimator 100, based on the received signal received at the antenna (not shown) of the communication station, estimates a time domain channel correlation value indicating time correlation on radio channels. Time domain channel correlation value estimator 100 corrects the estimated time domain channel correlation value based on SNR. Time domain channel correlation value estimator 100 supplies the corrected time domain channel correlation value to fading Doppler frequency estimator 200. The detailed configuration of time domain channel correlation value estimator 100 will be described later.

Fading Doppler frequency estimator 200, based on the time domain channel correlation value supplied from time domain channel correlation value estimator 100, estimates the fading Doppler frequency. It is known that the relationship between the time domain channel correlation value and the fading Doppler frequency is represented by a zero-ordered Bessel function. Accordingly, fading Doppler frequency estimator 200 can retain the information on the above relationship and estimate the fading Doppler frequency from the time domain channel correlation value by using that information.

Figure 2:
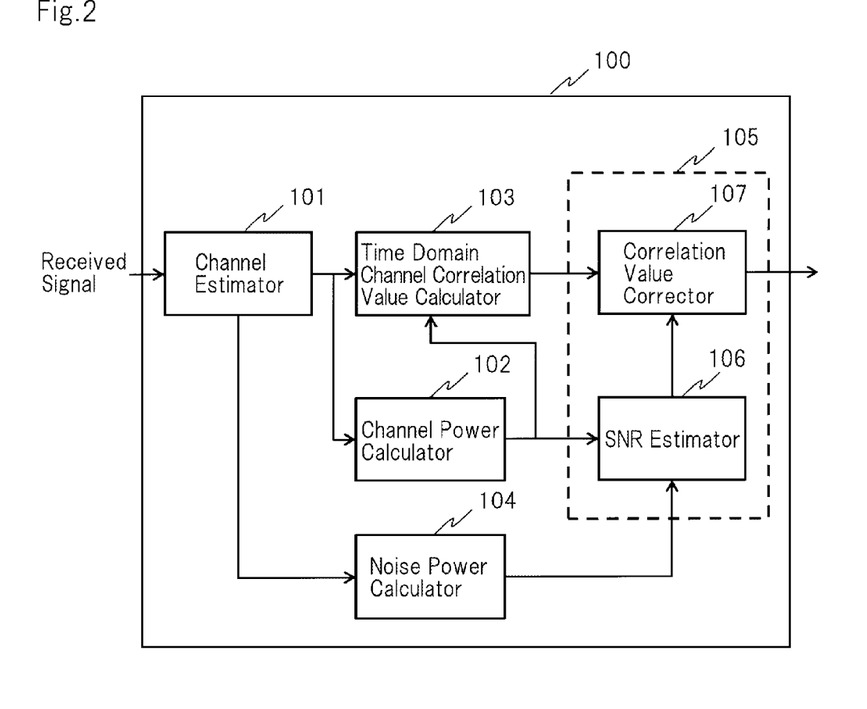
FIG. 2 A block diagram showing a detailed configuration of a time domain channel correlation value estimator according to the present exemplary embodiment.

Next, a detailed configuration of time domain channel correlation value estimator 100 will be described. FIG. 2 is a block diagram showing a detailed configuration of a time domain channel correlation value estimator according to the present exemplary embodiment. Time domain channel correlation value estimator 100 shown in FIG. 2 includes channel estimator 101, channel power calculator 102, time domain channel correlation value calculator 103, noise power calculator 104, SNR estimator 106, and correlation value estimator 107.

Channel estimator 101, based on the received signals received via a channel, acquires the estimated value of a channel that shows the channel characteristics of the radio channel. Channel estimator 101 also acquires the noise component from the received signal. Channel estimator 101 supplies the acquired channel estimated value to channel power calculator 102 and time domain channel correlation value calculator 103 and supplies the noise component to noise power calculator 104.

Channel power calculator 102 calculates channel power as the power of the received signal. Specifically, channel power calculator 102 calculates the channel power by successively adding up the square of the channel estimated value supplied from channel estimator 101 by N times, N which represents the number of samples for correlation value calculation. Channel power calculator 102 supplies the calculated channel power to time domain channel correlation value calculator 103 and SNR estimator 106.

Time domain channel correlation value calculator 103, based on the estimated value of the channel supplied from channel estimator 101, calculates a time domain channel correlation value showing the time correlation of the radio channel. Specifically, time domain channel correlation value calculator 103 stores the estimated value of the channel, and calculates the complex product of the current channel estimated value that has just been stored just and the previous channel estimated value that was stored last time, and adds up the calculated product by N times, N which represents the number of samples for correlation value calculation. Then, time domain channel correlation value calculator 103 divides the cumulative sum of the complex products by the channel power supplied from time domain channel correlation value calculator 103 to output a time domain channel correlation value. Time domain channel correlation value calculator 103 supplies the calculated time domain channel correlation value to correlation value corrector 107. Here, the time domain channel correlation value calculated by time domain channel correlation value calculator 103 is represented by the following expression (1).

[Math 1]

$$\frac{\sum_{n=1}^{N} \hat{\alpha}[n]\hat{\alpha}*[n-1]}{\sum_{n=1}^{N} |\hat{\alpha}[n]|^2} \quad \text{Ex. (1)}$$

In Ex. (1), n is an integer from 1 to N, and expresses the number of times the channel estimated values have been sampled as of the present moment. Further, $$\hat{\alpha}[n] \quad \text{[Math 2]}$$

and, $$\hat{\alpha}[n-1] \quad \text{[Math 3]}$$

are two consecutive channel estimated values, from among the channel estimated values that channel estimator 101 sequentially outputs, and the current channel estimated value and the previous channel estimated value, respectively.

[Math 4]

$$\sum_{n=1}^{N} |\hat{\alpha}[n]|^2$$

is the channel power, and, $$\hat{\alpha}*[n] \quad \text{[Math 5]}$$

is,
the complex conjugate of $$\hat{\alpha}[n] \quad \text{[Math 6]}$$

Noise power calculator 104 calculates the noise power, ie, the power of the noise component contained in the received signal. Specifically, noise power calculator 104 calculates the noise power by successively adding up the square of the amplitude of the noise component supplied from channel estimator 101. While the noise power of the noise component for N samples for correlation value calculation is being calculated, noise power calculator 104 supplies the calculated noise power to SNR estimator 106.

Corrector 105 corrects the channel power based on the noise power, and corrects the time domain channel correlation value, based on the corrected channel power and the aforementioned noise power. Specifically, corrector 105 includes SNR estimator 106 and correlation value corrector 107.

SNR estimator 106 estimates SNR based on the channel power supplied from channel power calculator 102 and the noise power supplied from noise power calculator 104. Specifically, SNR estimator 106 corrects the channel power based on the noise power and divides the corrected channel power by the noise power to estimate SNR. SNR estimator 106 supplies the estimated SNR to correlation value corrector 107. Here, the SNR calculated by SNR estimator 106 is represented by the following expression (2).

[Math 7]

$$SNR = \frac{\sum_{n=1}^{N} |\hat{\alpha}[n]|^2 - \sigma^2}{\sigma^2} \quad \text{Ex. (2)}$$

Here, in Ex. (2), $\sigma^2$ represents the noise power. In this way, SNR estimator 106 corrects the channel power by subtracting the noise power from the channel power.

Correlation value corrector 107 corrects the time domain channel correlation value calculated by time domain channel correlation value calculator 103 by use of the corrected channel power. Specifically, correlation value corrector 107 corrects the time domain channel correlation value by use of the SNR estimated by SNR estimator 106. The corrected time domain channel correlation value ρ is represented by the following expression (3).

[Math 8]

$$\rho = \frac{\sum_{n=1}^{N} \hat{\alpha}[n]\hat{\alpha}*[n-1]}{\sum_{n=1}^{N} |\hat{\alpha}[n]|^2} \frac{1+SNR}{SNR} \quad \text{Ex. (3)}$$

Next, the operation of fading Doppler frequency estimation device 10 will be described.

Figure 3:
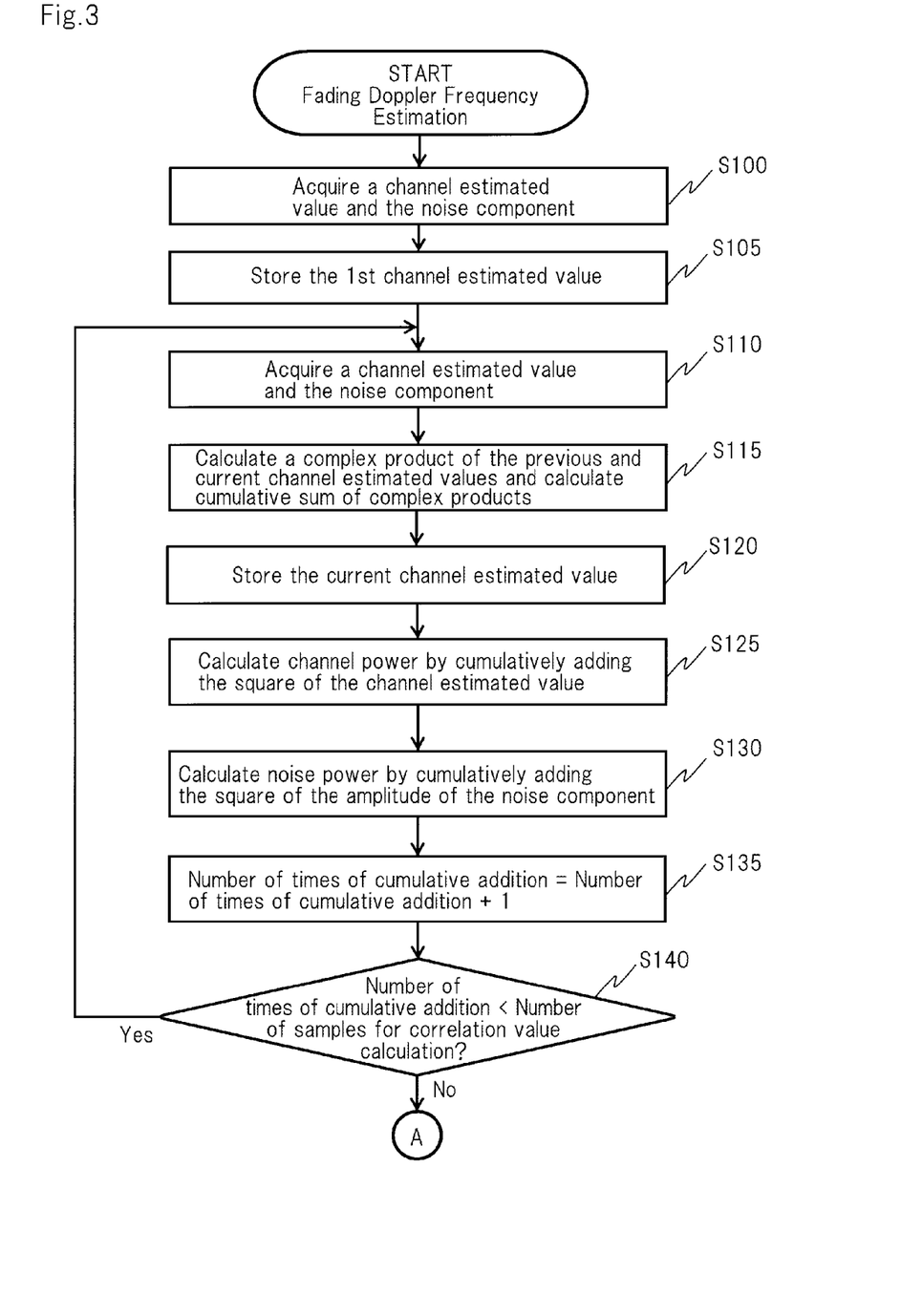
FIG. 3 A flow chart for explaining the process of estimating the fading Doppler frequency executed by the fading Doppler frequency estimation device according to the present exemplary embodiment.

FIG. 3 is a flow chart to explain the process of estimating the fading Doppler frequency executed by the fading Doppler frequency estimation device according to the present exemplary embodiment.

To begin with, as the received signal is input, channel estimator 101 acquires the estimated value of the channel and the noise component based on the input received signal. Then, channel estimator 101 supplies the estimated value of the channel to channel power calculator 102 and time domain channel correlation value calculator 103 and supplies the noise component to noise power calculator 104 (Step S100). Time domain channel correlation value calculator 103 stores the input channel estimated value as the first channel estimated value (Step S105).

Then, as the received signal is newly input, channel estimator 101 acquires the estimated value of the channel and the noise component based on the newly input received signal. Channel estimator 101 supplies the acquired channel estimated value to channel power calculator 102 and time domain channel correlation value calculator 103 and supplies the noise component to noise power calculator 104 (Step S110).

Time domain channel correlation value calculator 103 takes the complex products of the previously stored channel estimated value and the channel estimated value currently input from channel estimator 101, and calculates the cumulative sum having the calculated complex product added (Step S115).

Time domain channel correlation value calculator 103 stores this cumulative sum with the complex product added. Further, time domain channel correlation value calculator 103 stores the current channel estimated value used at Step S115. The estimated current value of the channel stored herein will be used as the estimated previous value of the channel when the process of Step S115 is executed next (Step S120).

Further, channel power calculator 102, based on the estimated value of the channel supplied from channel estimator 101, calculates the channel power by cumulatively adding up the squared value of the channel estimated value (Step S125).

Then, noise power calculator 104 calculates the noise power by cumulatively adding up the squared value of the amplitude of the noise component supplied from channel estimator 101 (Step S130). Channel estimator 101 increments the number of times of cumulative addition (Step S135).

Channel estimator 101 determines whether the number of times of cumulative addition is smaller than N which represents the number of samples for correlation value calculation (Step S140). Then, when the number of times of cumulative addition is smaller than N which represents the number of samples for correlation value calculation, channel estimator 101 again executes the process at Step S110.

Figure 4:
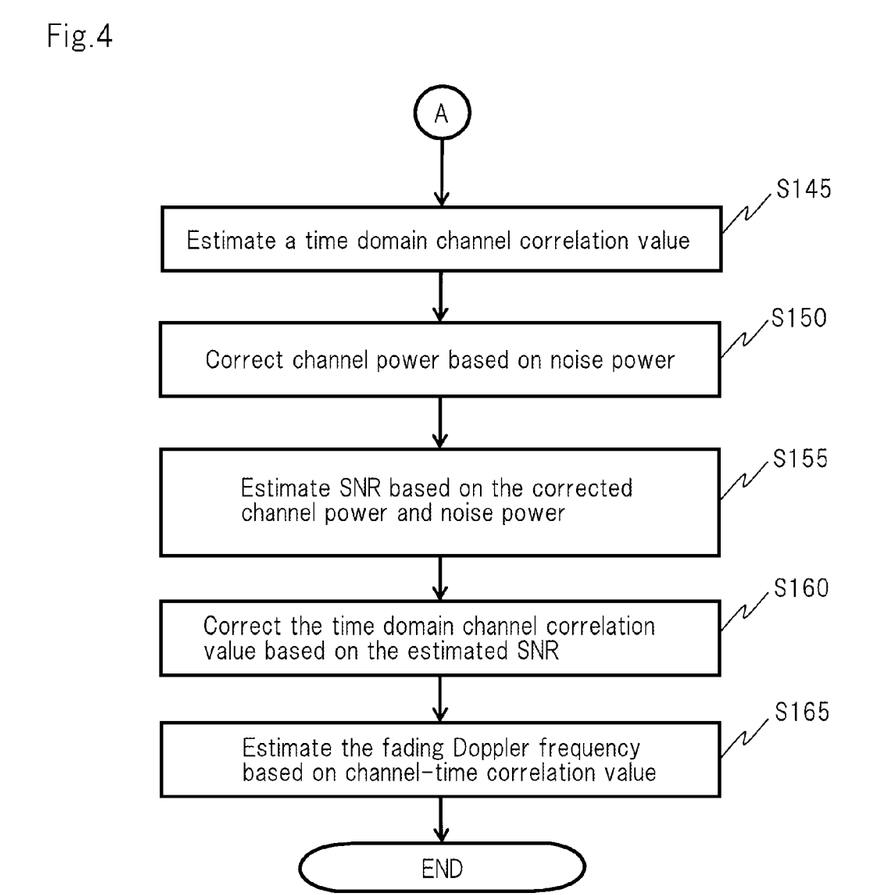
FIG. 4 A flow chart for explaining the process when the number of times of cumulative addition is equal to or greater than N which represents the number of samples for correlation value calculation FIG. 5 A block diagram showing a functional configuration of a fading Doppler frequency estimation device according to the second exemplary embodiment of the present invention.

FIG. 4 is a flow chart to explain the process when the number of times of cumulative addition is equal to or greater than N which represents the number of samples for correlation value calculation.

When the number of times of cumulative addition is equal to or greater than N which represents the number of samples for correlation value calculation, channel estimator 101 notifies channel power calculator 102, time domain channel correlation value calculator 103 and noise power calculator 104 that calculation of N samples for correlation value calculation has been ended. In response to this notice, channel power calculator 102 supplies the calculated channel power to time domain channel correlation value calculator 103 and SNR estimator 106 while noise power calculator 104 supplies the calculated noise power to SNR estimator 106.

Then, time domain channel correlation value calculator 103, based on the cumulative sum having the complex product of the estimated previous value of the channel and the estimated current value of the channel included and the channel power supplied from channel power calculator 102, estimates a time domain channel correlation value. Time domain channel correlation value calculator 103 supplies the estimated time domain channel correlation value to correlation value corrector 107 (Step S145).

Next, SNR estimator 106 corrects the channel power supplied from channel power calculator 102 by use of the noise power supplied from noise power calculator 104 (Step S150). Then, SNR estimator 106 estimates SNR from the corrected channel power and the noise power (Step S155). SNR estimator 106 supplies the estimated SNR to correlation value corrector 107.

Next, correlation value corrector 107, based on the SNR supplied from SNR estimator 106, corrects the time domain channel correlation value supplied from time domain channel correlation value calculator 103 (Step S160). Correlation value corrector 107 supplies the corrected time domain channel correlation value to fading Doppler frequency estimator 200.

Fading Doppler frequency estimator 200, based on the time domain channel correlation value supplied from correlation value corrector 107, estimates the fading Doppler frequency (Step S165).

As described heretofore, in the present exemplary embodiment, the channel power is corrected based on the noise power, then the time domain channel correlation value is corrected based on the corrected channel power and the aforementioned noise power. Then, based on the corrected time domain channel correlation value, the fading Doppler frequency is estimated. Accordingly, it is possible to mitigate the influence on the time domain channel correlation value from the noise component. As a result, even if the ratio of the noise component contained in the received signal is high, it is possible to accurately correct the time domain channel correlation value, hence improve the estimation accuracy of the fading Doppler frequency.

Further, in the present exemplary embodiment, channel power is corrected by subtracting the noise power from the channel power. Accordingly, it is possible to mitigate the influence of the noise power on the channel power in a more exact manner. As a result, it is possible to reliably correct the time domain channel correlation value, hence improve the estimation accuracy of the fading Doppler frequency.

Moreover, in the present embodiment, SNR that indicates the ratio of the corrected channel power to the noise power is calculated, then the time domain channel correlation value is corrected based on the calculated SNR. Accordingly, it is possible to correct the time domain channel correlation value by use of the SNR based on the channel power from which the influence of noise component has been reduced. As a result, it is possible to correct the time domain channel correlation value more exactly, hence improve the estimation accuracy of the fading Doppler frequency.

It should be noted that use of the fading Doppler frequency that is estimated based on the corrected channel power makes it possible to perform a more suitable communication control, hence improve the throughput between the base station and the mobile terminal The Second Exemplary Embodiment Next, the second exemplary embodiment of the present invention will be described.

Figure 5:
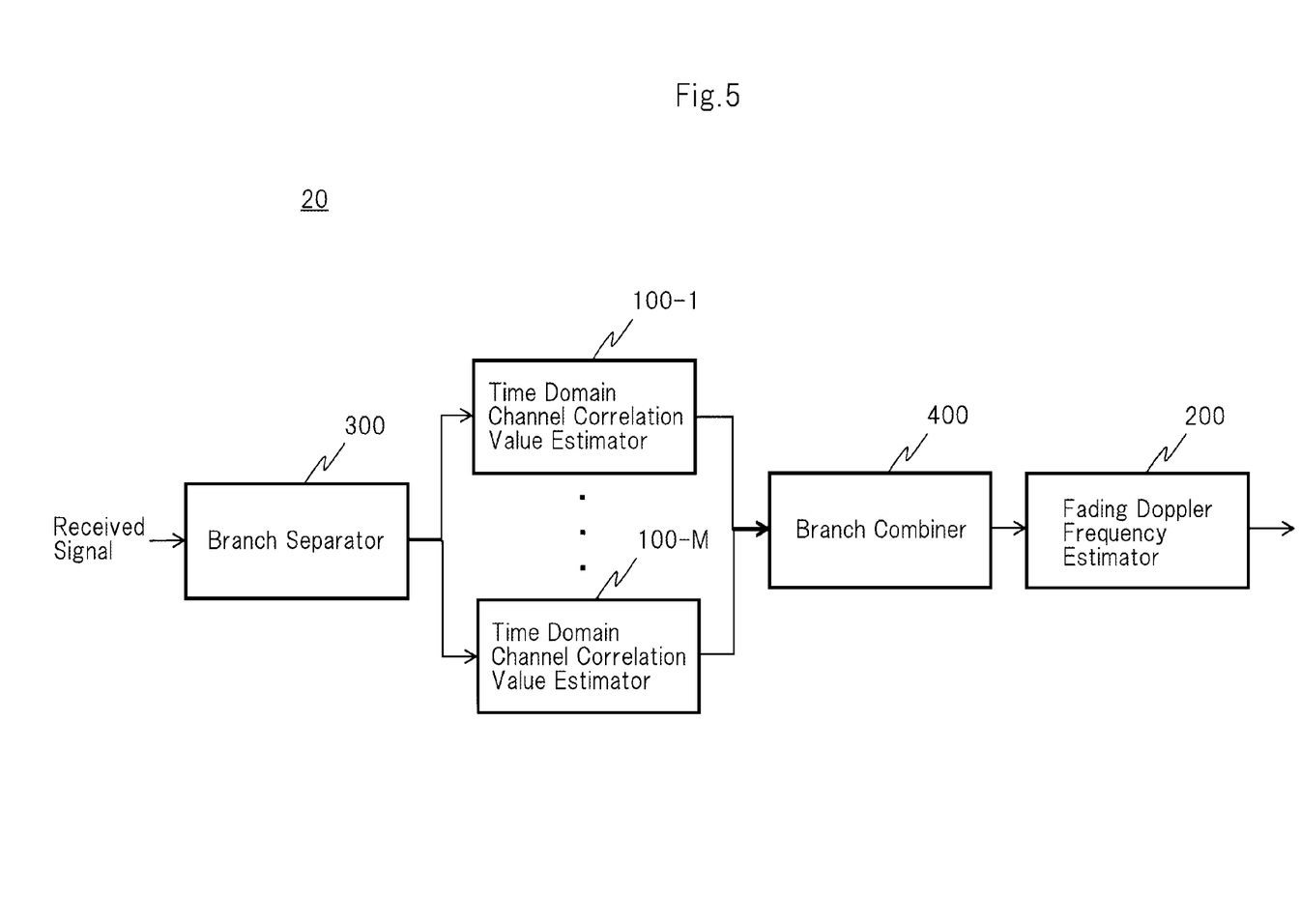

First, the functional configuration of a fading Doppler frequency estimation device according to the second exemplary embodiment of the present invention will be described. FIG. 5 is a block diagram showing a functional configuration of a fading Doppler frequency estimation device according to the second exemplary embodiment of the present invention.

Fading Doppler frequency estimation device 20 includes branch separator 300, a plurality of time domain channel correlation value estimators 100, branch combiner 400 and fading Doppler frequency estimator 200.

Fading Doppler frequency estimation device 20 includes M time domain channel correlation value estimators 100. In the following description, the m-th time domain channel correlation value estimator 100 is called time domain channel correlation value estimator 100-$m$, where m is an integer from 1 to M.

Branch separator 300 is a distributor that distributes each of plural individual received signals received at different plural antennas (not shown) to any one of the time domain channel correlation value estimators 100 as a received signal. Branch separator 300 sorts the individual received signal of each antenna, based on the predetermined criteria and supplies the signal to any one of time domain channel correlation value estimators 100. For example, branch separator 300, based on the predetermined correspondence relationship between antennas and time domain channel correlation value estimators 100, sorts out the individual received signals. Herein, the antennas and time domain channel correlation value estimators 100 may be related one-to-one, or plural antennas may be related to a single time domain channel correlation value estimator 100. The case in which plural antennas may be related to a single time domain channel correlation value estimator 100 enables a more simple device configuration.

Time domain channel correlation value estimator 100 estimates a time domain channel correlation value based on the received signal supplied from branch separator 300. The details of the time domain channel correlation value estimation process executed by time domain channel correlation value estimator 100 is the same as that described in the first exemplary embodiment.

Here, the output, $\rho_m$, of time domain channel correlation value estimator 100-$m$ ($m=1$ to $M$) is represented by the following expression (4).

[Math 9]

$$\rho_m = \frac{\sum_{n=1}^{N} \hat{\alpha}_m[n]\hat{\alpha}_m^*[n-1]}{\sum_{n=1}^{N} |\hat{\alpha}_m[n]|^2} \cdot \frac{1+SNR_m}{SNR_m} \qquad \text{Ex. (4)}$$

Here, subscript m shows the value that is calculated or estimated by m-th time domain channel correlation value estimator 100-$m$ among plural time domain channel correlation value estimators 100. For example, $SNR_m$ is the SNR that is estimated by SNR estimator 106 of time domain channel correlation value estimator 100-$m$, and represented by the following expression (5).

[Math 10]

$$SNR_m = \frac{\sum_{n=1}^{N} |\hat{\alpha}_m[n]|^2 - \sigma_m^2}{\sigma_m^2} \qquad \text{Ex. (5)}$$

Time domain channel correlation value estimator 100-$m$ estimates a corresponding time domain channel correlation value and supplies the estimated time domain channel correlation value $\rho_m$ to branch combiner 400.

Branch combiner 400 is a combined correlation value calculator that calculates a combined correlation value $\rho_c$, that is obtained by combining plural time domain channel correlation values $\rho_m$ estimated by each of plural time domain channel correlation value estimators 100. Branch combiner 400 supplies combined correlation value $\rho_c$ to fading Doppler frequency estimator 200.

Branch combiner 400 may, for example, output the average of plural time domain channel correlation values $\rho_m$ as combined correlation value $\rho_c$. In this case, combined correlation value $\rho_c$ can be represented by the following expression (6).

[Math 11]

$$\rho_c = \frac{1}{M}\sum_{m=1}^{M} \rho_m \qquad \text{Ex. (6)}$$

It is also possible that branch combiner 400 calculates combined correlation value $\rho_c$ by weighting plural time domain channel correlation values $\rho_m$ with a weight that is proportional to the corresponding SNR estimated value. In this case, combined correlation value $\rho_c$ may be represented by the following expression (7).

[Math. 12]

$$\rho_c = \frac{\sum_{m=1}^{M} \rho_m SNR_m}{\sum_{m=1}^{M} SNR_m} \qquad \text{Ex. (7)}$$

Alternatively, branch combiner 400 may output as combined correlation value $\rho_c$ the maximum value $\rho_{m_{MAX}}$ that is the output from time domain channel correlation value estimator 100-$m_{MAX}$ presenting the maximum SNR estimated value, from among plural time domain channel correlation values $\rho_m$. In this case, combined correlation value $\rho_c$ may be represented by the following expression (8).

[Math 13]

$$\rho_c = \rho_{m_{MAX}}, \; m_{MAX} = \underset{m\in\{1,2,\ldots,M\}}{\operatorname{argmax}} (SNR_m) \qquad \text{Ex. (8)}$$

Fading Doppler frequency estimator 200, based on the combined correlation value $\rho_c$ input from branch combiner 400, estimates the fading Doppler frequency.

Next, the operation of fading Doppler frequency estimation device 20 will be described.

Figure 6:
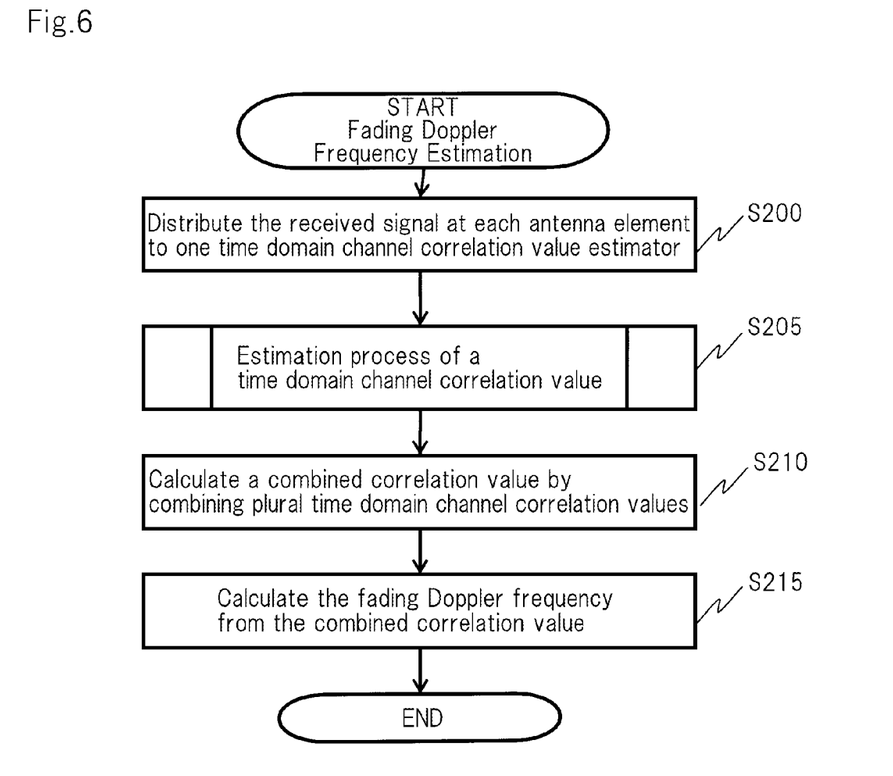
FIG. 6 A flow chart for explaining the process of estimating the fading Doppler frequency executed by the fading Doppler frequency estimation device according to the present exemplary embodiment.

FIG. 6 is a flow chart for explaining the process of estimating the fading Doppler frequency executed by the fading Doppler frequency estimation device according to the present exemplary embodiment.

First, branch separator 300 distributes and supplies the input individual received signals to different time domain channel correlation value estimators 100 separately for individual antennas (Step S200). Then, the time domain channel correlation value estimators 100 that have received the received signal each execute a process of estimating a time domain channel correlation value (Step S205). Here, the process at Step S205 of estimating a time domain channel correlation value is the process from Steps S100 to S160 in FIGS. 3 and 4.

At Step S205, when plural time domain channel correlation value estimators 100 estimate time domain channel correlation values to be input to branch combiner 400, branch combiner 400 combines the input plural time domain channel correlation values to calculate combined correlation value $\rho_c$. Branch combiner 400 supplies the combined correlation value $\rho_c$ to fading Doppler frequency estimator 200 (Step S210).

Then, fading Doppler frequency estimator 200, based on the input combined correlation value $\rho_c$ from branch combiner 400, estimates the fading Doppler frequency (Step S220).

As described above, according to the present exemplary embodiment, in the case where the fading Doppler frequency is estimated based on the individual received signals that have been received by plural antennas, the received signal of each antenna is allotted to any one of time domain channel correlation value estimators 100 as the received signal. The time domain channel correlation value estimator 100 corrects the channel power based on the noise power, and corrects the time domain channel correlation value based on the corrected channel power and the aforementioned noise power. At this stage, time domain channel correlation value estimator 100 calculates the time domain channel correlation value, channel power and noise power based on the same received signal that has been received by the same antenna. Then, branch combiner 400 combines the plural time domain channel correlation values estimated by different time domain channel correlation value estimators 100 to calculate a combined correction value. As a result, even if the ratio of the noise component contained in the received signal of each antenna is different from the others, it is possible to obtain a time domain channel correlation value with high accuracy.

Herein, the components in each exemplary embodiment described above can be realized by a processing unit such as a semiconductor integrated circuit, baseband signal processor (BB: Baseband signal processor) card, and the like.

Although the present invention has been explained with reference to the exemplary embodiments, the present invention should not be limited to the above exemplary embodiments. Various modifications that can be understood by those skilled in the art may be made to the structures and details of the present invention within the scope of the present invention.

For example, in the above exemplary embodiment, the device and method for estimating the fading Doppler frequency have been described. However, it is possible to provide a program that describes the procedures of the process of realizing fading Doppler frequency estimation device 10 or 20, as well as a computer-readable recording medium with the program recorded thereon.

This application claims priority based on Japanese Patent Application No. 2012-152479, filed on Jul. 6, 2012, and should incorporate all the disclosure thereof herein.

DESCRIPTION OF REFERENCE NUMERALS 10, 20 fading Doppler frequency estimation device
100 time domain channel correlation value estimator
200 fading Doppler frequency estimator
300 branch separator
400 branch combiner
101 channel estimator
102 channel power calculator
103 time domain channel correlation value calculator
104 noise power calculator
105 corrector
106 SNR estimator
107 correlation value corrector

The invention claimed is:

1. A fading Doppler frequency estimation device comprising:
    a channel estimator that, based on a received signal received through a radio channel, estimates an estimated value of a channel showing channel characteristics of the radio channel;
    a channel power calculator that calculates channel power as a power of the received signal, based on the estimated value of the channel;
    a correlation value calculator that receives as input the estimated value of the channel and the calculated channel power and calculates a time domain channel correlation value showing a time correlation of the radio channel, based on the estimated value of the channel and the calculated channel power;
    a noise power calculator that calculates noise power as a power of the noise component contained in the received signal;
    a corrector that corrects the channel power based on the noise power to obtain a corrected channel power and corrects the time domain channel correlation value based on the corrected channel power and the noise power; and
    a fading Doppler frequency estimator that estimates a fading Doppler frequency based on the corrected time domain channel correlation value.

2. The fading Doppler frequency estimation device according to claim 1, wherein the corrector corrects the channel power by subtracting the noise power from the channel power calculated at the channel power calculator.

3. The fading Doppler frequency estimation device according to claim 2, wherein the corrector calculates the signal-to-noise power ratio that represent the ratio of the corrected channel power to the noise power and corrects the time domain channel correlation value based on the signal-to-noise power ratio.

4. The fading Doppler frequency estimation device according to claim 3, further comprising:
    a plurality of time domain channel correlation value estimators that include the channel estimator, the correlation value calculator, the channel power calculator, the noise power calculator and the corrector;
    a distributor that distributes each of a plurality of received signals received at a plurality of antennas to any one of the time domain channel correlation value estimators as the received signal; and,
    a combined correlation value calculator that combines a plurality of time domain channel correlation values corrected by the individual correctors of the plural time domain channel correlation value estimators to calculate a combined correlation value,
    wherein the fading Doppler frequency estimator estimates the fading Doppler frequency based on the combined correlation value.

5. The fading Doppler frequency estimation device according to claim 2, further comprising:
    a plurality of time domain channel correlation value estimators that include the channel estimator, the correlation value calculator, the channel power calculator, the noise power calculator and the corrector;
    a distributor that distributes each of a plurality of received signals received at a plurality of antennas to any one of the time domain channel correlation value estimators as the received signal; and,
    a combined correlation value calculator that combines a plurality of time domain channel correlation values corrected by the individual correctors of the plural time domain channel correlation value estimators to calculate a combined correlation value,
    wherein the fading Doppler frequency estimator estimates the fading Doppler frequency based on the combined correlation value.

6. The fading Doppler frequency estimation device according to claim 1, wherein the corrector calculates the signal-to-noise power ratio that represent the ratio of the corrected channel power to the noise power and corrects the time domain channel correlation value based on the signal-to-noise power ratio.

7. The fading Doppler frequency estimation device according to claim 6, further comprising:
- a plurality of time domain channel correlation value estimators that include the channel estimator, the correlation value calculator, the channel power calculator, the noise power calculator and the corrector;
- a distributor that distributes each of a plurality of received signals received at a plurality of antennas to any one of the time domain channel correlation value estimators as the received signal; and,
- a combined correlation value calculator that combines a plurality of time domain channel correlation values corrected by the individual correctors of the plural time domain channel correlation value estimators to calculate a combined correlation value,
- wherein the fading Doppler frequency estimator estimates the fading Doppler frequency based on the combined correlation value.

8. The fading Doppler frequency estimation device according to claim 1, further comprising:
- a plurality of time domain channel cross-correlation value estimators that include the channel estimator, the correlation value calculator, the channel power calculator, the noise power calculator, and the corrector;
- a distributor that distributes each of a plurality of received signals received at a plurality of antennas to any one of the time domain channel cross-correlation value estimators as the received signal; and,
- a combined correlation value calculator that combines a plurality of time domain channel cross-correlation values corrected by the individual correctors of the plural time domain channel cross-correlation value estimators to calculate a combined correlation value,
- wherein the fading Doppler frequency estimator estimates the fading Doppler frequency based on the combined correlation value.

9. A fading Doppler frequency estimation method comprising:
- acquiring, based on a received signal through a radio channel, a channel estimated value showing channel characteristics of the radio channel;
- calculating a channel power as a power of the received signal, based on the estimated value of the channel;
- receiving as input the estimated value of the channel and the calculated channel power and calculating a time domain channel correlation value showing a time correlation of the radio channel, based on the estimated value of the channel and the calculated channel power;
- calculating noise power as a power of the noise component contained in the received signal;
- correcting the channel power based on the noise power to obtain a corrected channel power;
- correcting the time domain channel correlation value based on the corrected channel power; and
- estimating the fading Doppler frequency based on the corrected time domain channel correlation value and the noise power.

* * * * *